(12) United States Patent
Levy et al.

(10) Patent No.: US 7,840,472 B1
(45) Date of Patent: Nov. 23, 2010

(54) METHOD AND APPARATUS FOR HOLDING AN ONLINE LIVE AUCTION TO COMBINE FEATURES OF BOTH THE INTERNET AND TRADITIONAL, REAL WORLD AUCTIONS

(75) Inventors: Daniele Levy, San Francisco, CA (US); Brad Handler, Menlo Park, CA (US)

(73) Assignee: eBay Inc., San Jose, CA (US)

( * ) Notice: Subject to any disclaimer, the term of this patent is extended or adjusted under 35 U.S.C. 154(b) by 863 days.

(21) Appl. No.: 09/620,809

(22) Filed: Jul. 21, 2000

Related U.S. Application Data

(63) Continuation-in-part of application No. 09/457,466, filed on Dec. 8, 1999, now Pat. No. 7,162,446.

(51) Int. Cl.
*G06F 17/60* (2006.01)
(52) U.S. Cl. .......................................... 705/37; 705/38
(58) Field of Classification Search .................. 705/37, 705/38
See application file for complete search history.

(56) References Cited

U.S. PATENT DOCUMENTS

| | | | |
|---|---|---|---|
| 3,573,747 A | 4/1971 | Adams et al. |
| 3,581,072 A | 5/1971 | Nymayer |
| 3,687,256 A | 8/1972 | Jones |
| 4,412,287 A | 10/1983 | Braddock, III |
| 4,674,044 A | 6/1987 | Kalmus et al. |
| 4,677,552 A | 6/1987 | Sibley, Jr. |
| 4,789,928 A | 12/1988 | Fujisaki |
| 4,799,156 A | 1/1989 | Shavit et al. |
| 4,823,265 A | 4/1989 | Nelson |
| 4,864,516 A | 9/1989 | Gaither et al. |
| 4,903,201 A | 2/1990 | Wagner |

(Continued)

FOREIGN PATENT DOCUMENTS

CA 2253543 3/1997

(Continued)

OTHER PUBLICATIONS

PCT/US99/18510 filing date Aug. 12, 1999, 4 pages.

(Continued)

*Primary Examiner*—Daniel S Felten
(74) *Attorney, Agent, or Firm*—Schwegman, Lundberg & Woessner, P.A.

(57) ABSTRACT

A method and apparatus are provided for conducting a live auction that combines various features of traditional and online auctions. According to one aspect of the present invention, the live auction includes a live, in-person auction component and a real-time online bidding environment component. Bidding information associated with an item in the online bidding environment is updated to reflect a current bid associated with the item in the live, in-person auction. During the live, in-person auction, a bid is be accepted from an online bidder in the online environment that reflects the online bidder's bid price for the item. Subsequently, the system bids on behalf of the online bidder against other online bidders as well as one or more live bidders that are participating in the live, in-person. As such, the live auction enables real-time online bidding in a live, in-person auction.

17 Claims, 13 Drawing Sheets

U.S. PATENT DOCUMENTS

| | | | |
|---|---|---|---|
| 4,992,940 A | 2/1991 | Dworkin | |
| 5,063,507 A | 11/1991 | Lindsey et al. | |
| 5,077,665 A | 12/1991 | Silverman et al. | |
| 5,101,353 A | 3/1992 | Lupien et al. | |
| 5,136,501 A | 8/1992 | Silverman et al. | |
| 5,168,446 A | 12/1992 | Wiseman | |
| 5,205,200 A | 4/1993 | Wright | |
| 5,243,515 A | 9/1993 | Lee | |
| 5,258,908 A | 11/1993 | Hartheimer et al. | |
| 5,280,305 A | 1/1994 | Monroe | |
| 5,280,422 A | 1/1994 | Moe et al. | |
| 5,283,731 A | 2/1994 | Lalonde et al. | |
| 5,285,383 A | 2/1994 | Lindsey et al. | |
| 5,297,031 A | 3/1994 | Gutterman et al. | |
| 5,297,032 A | 3/1994 | Trojan et al. | |
| 5,305,200 A | 4/1994 | Hartheimer et al. | |
| 5,325,297 A | 6/1994 | Bird et al. | |
| 5,329,589 A | 7/1994 | Fraser et al. | |
| 5,335,170 A | 8/1994 | Petteruti et al. | |
| 5,345,091 A | 9/1994 | Craig | |
| 5,375,055 A | 12/1994 | Togher et al. | |
| 5,383,113 A | 1/1995 | Kight et al. | |
| 5,394,324 A | 2/1995 | Clearwater | |
| 5,402,336 A | 3/1995 | Spiegelhoff et al. | |
| 5,424,944 A | 6/1995 | Kelly | |
| 5,426,281 A | 6/1995 | Abecassis | |
| 5,453,926 A | 9/1995 | Stroschin et al. | |
| 5,485,510 A | 1/1996 | Colbert | |
| 5,521,815 A | 5/1996 | Rose, Jr. | |
| 5,526,479 A | 6/1996 | Barstow et al. | |
| 5,539,450 A * | 7/1996 | Handelman | 348/12 |
| 5,553,145 A | 9/1996 | Micali | |
| 5,557,728 A | 9/1996 | Garrett et al. | |
| 5,592,375 A | 1/1997 | Salmon et al. | |
| 5,596,994 A | 1/1997 | Bro | |
| 5,598,557 A | 1/1997 | Doner et al. | |
| 5,640,569 A | 6/1997 | Miller et al. | |
| 5,657,389 A | 8/1997 | Houvener | |
| 5,664,111 A | 9/1997 | Nahan et al. | |
| 5,664,115 A | 9/1997 | Fraser | |
| 5,675,784 A | 10/1997 | Maxwell et al. | |
| 5,689,652 A | 11/1997 | Lupien et al. | |
| 5,694,546 A | 12/1997 | Reisman | |
| 5,706,457 A | 1/1998 | Dwyer et al. | |
| 5,708,780 A | 1/1998 | Levergood et al. | |
| 5,710,889 A | 1/1998 | Clark et al. | |
| 5,715,314 A | 2/1998 | Payne et al. | |
| 5,715,402 A | 2/1998 | Popolo | |
| 5,717,989 A | 2/1998 | Tozzoli et al. | |
| 5,722,418 A | 3/1998 | Bro | |
| 5,727,165 A | 3/1998 | Ordish et al. | |
| 5,737,599 A | 4/1998 | Rowe et al. | |
| 5,760,917 A | 6/1998 | Sheridan | |
| 5,761,655 A | 6/1998 | Hoffman | |
| 5,771,291 A | 6/1998 | Newton et al. | |
| 5,771,380 A | 6/1998 | Tanaka et al. | |
| 5,790,790 A | 8/1998 | Smith et al. | |
| 5,794,207 A | 8/1998 | Walker et al. | |
| 5,794,216 A | 8/1998 | Brown | |
| 5,794,219 A | 8/1998 | Brown | |
| 5,799,285 A | 8/1998 | Klingman | |
| 5,803,500 A | 9/1998 | Mossberg | |
| 5,818,914 A | 10/1998 | Fujisaki | |
| 5,826,241 A | 10/1998 | Stein et al. | |
| 5,826,244 A | 10/1998 | Huberman | |
| 5,835,896 A | 11/1998 | Fisher et al. | |
| 5,845,265 A | 12/1998 | Woolston | |
| 5,845,266 A | 12/1998 | Lupien et al. | |
| 5,850,442 A | 12/1998 | Muftic | |
| 5,872,848 A | 2/1999 | Romney et al. | |
| 5,873,069 A | 2/1999 | Reuhl et al. | |
| 5,884,056 A | 3/1999 | Steele | |
| 5,890,138 A | 3/1999 | Godin et al. | |
| 5,905,974 A | 5/1999 | Fraser et al. | |
| 5,905,975 A | 5/1999 | Ausubel | |
| 5,913,040 A | 6/1999 | Rakavy et al. | |
| 5,922,074 A | 7/1999 | Richard et al. | |
| 5,924,072 A | 7/1999 | Havens | |
| 5,926,794 A | 7/1999 | Fethe | |
| 5,974,398 A | 10/1999 | Hanson et al. | |
| 5,974,412 A | 10/1999 | Hazlehurst | |
| 5,991,739 A | 11/1999 | Cupps et al. | |
| 6,012,045 A | 1/2000 | Barzilai et al. | |
| 6,023,685 A | 2/2000 | Brett et al. | |
| 6,035,288 A | 3/2000 | Solomon | |
| 6,035,402 A | 3/2000 | Vaeth et al. | |
| 6,044,363 A | 3/2000 | Mori et al. | |
| 6,047,264 A | 4/2000 | Fisher et al. | |
| 6,049,785 A | 4/2000 | Gifford | |
| 6,055,518 A | 4/2000 | Franklin et al. | |
| 6,058,417 A | 5/2000 | Hess et al. | |
| 6,061,448 A | 5/2000 | Smith et al. | |
| 6,073,117 A | 6/2000 | Oyanagi et al. | |
| 6,078,906 A | 6/2000 | Huberman | |
| 6,085,176 A | 7/2000 | Woolston | |
| 6,104,815 A | 8/2000 | Alcorn et al. | |
| 6,119,137 A | 9/2000 | Smith et al. | |
| 6,141,653 A | 10/2000 | Conklin et al. | |
| 6,178,408 B1 | 1/2001 | Copple et al. | |
| 6,192,407 B1 | 2/2001 | Smith et al. | |
| 6,202,051 B1 | 3/2001 | Woolston | |
| 6,243,691 B1 | 6/2001 | Fisher et al. | |
| 6,415,269 B1 * | 7/2002 | Dinwoodie | 705/37 |
| 6,449,601 B1 * | 9/2002 | Friedland et al. | 705/37 |
| 6,523,037 B1 | 2/2003 | Monahan et al. | |
| 2003/0131006 A1 | 7/2003 | Monahan et al. | |
| 2006/0112003 A1 | 5/2006 | Levy et al. | |

FOREIGN PATENT DOCUMENTS

| | | |
|---|---|---|
| FR | 2658635 A1 | 2/1991 |
| JP | 04-342065 | 11/1992 |
| JP | 10-229555 | 8/1998 |
| JP | 2005-050288 | 2/2005 |
| KR | 2000003733 A | 7/2000 |
| NL | 9300266 | 2/1993 |
| WO | WO 92/15174 | 2/1992 |
| WO | WO 94/22108 | 9/1994 |
| WO | WO 95/17711 | 6/1995 |
| WO | WO 96/34356 | 4/1996 |
| WO | WO 97/37315 | 3/1997 |
| WO | WO-9737315 A1 | 10/1997 |
| WO | WO 98/34189 * | 6/1998 |
| WO | WO 98/35468 | 8/1998 |
| WO | WO-9834187 | 8/1998 |
| WO | WO-9834187 A1 | 8/1998 |
| WO | US99/18510 | 10/1998 |
| WO | WO 99/63461 | 12/1999 |
| WO | WO-9963461 | 12/1999 |
| WO | WO-0022907 A2 | 4/2000 |
| WO | WO-0025218 | 5/2000 |
| WO | WO-0039735 A2 | 7/2000 |
| WO | US00/32088 | 4/2001 |
| WO | WO-0141013 | 6/2001 |

OTHER PUBLICATIONS

Yahoo Auctions Website, download Oct. 23, 1998 from www.auctions.yahoo.com, 5 pages.

Onsale Auction Website, download Oct. 23, 1998 from www.onsale.com, 3 pages.

Netgrocer Website, downloaded Oct. 23, 1998 from website www.netgrocer.com, 3 pages.

Auction Universe Website, downloaded Oct. 23, 1998 from www.auctionuniverse.com, 6 pages.

European Patent Office Search Report, RS 102472 US, 4 pages.

Hong et al., "Multilingual Information Retrieval Systems", Multimedia Storage and Archivings System, Nov. 18-19, 1996, 16 pages.

Liepens et al. "A Browser Based Image Bank, Useful Tool or Expensive Toy" MEDNET 97, Nov. 1997, 11 pages.

Mohan, "Text-Based Search of TV News Stories", Multimedia Storage and Archiving Systems, Nov. 18-19, 1996, 16 pages.

Auction House Moves for Internet Business:, Internet Business News, Dialog File 636, Access No. 02809791, Aug. 1995.

"Bid.com Announces www.dutchauction.com", Business Wire, p. 1464. Dialog File 16 Access No. 05914806.

Ootake, T. , "Monthly Turnover of Ten Million Yen Through Auctions: Stake on EC by Introducing a New System", *Orient Corporation, Nikkei Multimedia*, (Aug. 15, 1998),92-97.

Beam, Carrie, et al., "Automated Negotiations: A Survey of the State of the Art", *Fisher Center for Information Technology & Management—Walter A. Haas School of Business*, 14 Pages.

Beam, Carrie, et al., "Electronic Negotiation through Internet-based Auctions", *CITM Working Paper 96-WP-1019, Fisher Center for Information Technology & Management—Walter A. Haas School of Business*, (Dec. 1996), 39 Pages.

Kikuchi, Hiroaki, et al., "Multi-Round Anonymous Auction Protocols", *IEICE Trans. Inf. & Syst.*, vol. E82-D, No. 4, (Apr. 1999), 769-777.

Teich, Jeffrey, et al., "Multiple-issue auction and market algorithms for the world wide web", *Decision Support Systems*, vol. 26, (1999), 49-66.

U.S. Appl. No. 11/264,526 , Non-Final Office Action mailed Sep. 8, 2009, 5 Pgs.

U.S. Appl. No. 11/264,526, Final Office Action mailed Apr. 24, 2009, 11 pgs.

U.S. Appl. No. 11/264,526, Response filed Jul. 24, 2009 to Final Office Action mailed Apr. 24, 2009, 13 pgs.

Canadian Application No. 2,353,999, Office Action Mailed Apr. 27, 2009, 112 pgs.

Japanese Application No. 2000-587289, Office Action mailed May 26, 2009, 5 pgs.

Malone, TW; Yates, J; et al., "Electrnic Markets and Electronic Hierarchies", *Communications—of the ACM*, Jun. 1987, pp. 484-497, vol. 30, No. 6, USA.

Warbelow, A; Kokuryo, J, "Aucnet: TV Auction Network System". *Harvard Business School Case/Study*, Jul. 1989, pp. 1-15, HBVR# 9-190-001, USA.

"Personal Optimized Decision/Transaction Program", *IBM Technocal Disclosure Bulletin*, Jan. 1995, pp. 83-84, vol. 38, No. 1, USA.

Neo, BS, "The implementation of an electronic market for pig trading in Singapore", *Journal of Strategic Information Systems*, Dec. 1992, pp. 278-288, vol. 1, No. 5.

Rockoff, TE; Groves, M., "Design of an Internet-based system for remote Dutch auctions", *Internet Reaearch—Electrnic Networking Applications and Policy*, Jan. 1, 1995, vol. 5, No. 4, pp. 10-16.

Massimb, MN; Phelps, BD, "Electronic Trading, Market Structure and Liquifity", *Financial Analysts Journal*, Jan.-Feb. 1994, vol. 50, No. 1, pp. 39-50, Charlottesville, Virginia.

Post, DL; Coppinger, SS, et al., "Application of Auctions as a Pricing Mechinism for the Interchange of Electric Power", *IEEE Transactions on Power Systems*, Aug. 1995, pp. 7, Vol.

Hess, CM; Kemerer, CF., "Computerized Loan Organization System: An Industry Case Study of the Electronic Markets Hypothesis", *MIS Quarterly*, Sep. 1994, vol. 18, No. 3, pp. 251-274.

Reck, Martin, "Formally Specifying and Automated Trade Execution System", *Journal of Systems and Software*, 1993, pp. 245-252, vol. 21, Elsevier Science Publishing Co., Inc. New York, Ny.

"Anonymous Delivery of Goods in Electronic Commerce", *IBM Technocal Disclosure Bulletin*, Mar. 1996, pp. 363-366, vol. 39, No. 3.

Lee, G., "Electronic Brokerage and Electronic Auction: The Impact of IT on Market Structures", *Proceedings of the 29th HICSS*, 1996, pp. 397-406, vol. IV.

Clemins, E; Weber, B., "Evaluating the Prospects for Alternative Electronic Securities Markets", *International Conference on Information Systems*, 1991, pp. 53-61, vol. 12.

Mardesich, J., "Onsale Takes Auction gavel electronic", *Computer Reseller News*, Jul. 8, 1996, p. 2 continued on p. 32, Mountain View, California.

"Onsale joins fray as online shopping picks up speed: Internet Booms", *Computer Reseller News*, Jun. 5, 1995, p. 73, CMP Publications, Inc., USA.

Siegmann, Ken, "Nowhere to go but up", *PC Week*, Oct. 23, 1995, p. 1-3, vol. 12, No. 42, Ziff-Davis Publishing Company.

"Onsale: Onsale Brings Thrill of Auctions and Bargain Hunting Online; Unique Internet retail service debuts with week-long charity auction for the Computer Museum in Boston", May 24, 1995, pp. 3.

Schmid, BF., "The Development of Electronic Commerce", *Newsletter of the Competence Centre Electrnic Markets*, Oct. 1993, No. 9/10.

Tjostheim, I; Eide, J., "A case study of an on-line auction for the World Wide Web", *Norwegian Computing Center*, No Date Given, pp. 1-10.

Graham, I., "The Emergence of Linked Fish Markets in Europe", *Focus Theme*, No Date Given, pp. 1-3.

Reck, Martin., "Trasing-Process Characteristics of Electronic Auctions", *Focus Theme*, No Date Given, pp. 1-7.

Van Heck, E; Ribbers, PM., "Experiences with Electronic Auctions in the Dutch Flower Industry", *Focus Theme*, No Date Given, pp. 1-6.

Lee, HG., "Aucnet: Electronic Intermediary for Used-car Transactions", *Focus Theme*, No Date Given, pp. 1-5.

Klein, S., "Introduction to Electronic Auctions", *Focus Theme*, No Date Given, pp. 1-4.

Turban, E., "Auctions and Bidding on the Internet an Assessment", *Focus Theme*, No Date Given, pp. 1-5.

Zwass, Vladimir., "Electronic Commerce: Structures and Issues", *International Journal of Electrnic Commerce*, Fall 1996, pp. 3-23, vol. 1, No. 1.

"Bid.com Announces www.dutchauction.com", *Business Wire*, Dialog File 16, Access No. 05914806,(Oct. 28, 1998),1464.

"MOAI Technologies Announce Live Exchange 2.1", *PR Newswire*, (Sep. 14, 1998).

Biais, Bruno, et al., "An empirical analysis of the limit order book and the order flow in the Paris Bourse", *Journal of Finance*, 50(5), (Dec. 1995), 1655-1689.

Cooper, J., "Going Going Gone! Tradition Gives Way to Technology", *British Telecom World*, Dialog File 148, Access No. 04587041,(Mar. 1990).

Dunlap, C. , "Going Once, Going Twice . . . Sold!", *Computer Reseller News*, (Dec. 1997),n766 pp. 1.

Telecomworldwire, "Auction House Moves For Internet Business", *Internet Business News*, Dialog File 636, Access No. 02809791,(Aug. 1995).

"U.S. Appl. No. 09/457,466 Advisory Action mailed Jul. 1, 2004", 2 pgs.

"U.S. Appl. No. 09/457,466 Final Office Action mailed Apr. 13, 2004", 11 pgs.

"U.S. Appl. No. 09/457,466 Final Office Action mailed Nov. 28, 2001", 6 pgs.

"U.S. Appl. No. 09/457,466 Non Final Office Action mailed Mar. 29, 2001", 9 pgs.

"U.S. Appl. No. 09/457,466 Non Final Office Action mailed Jun. 4, 2002", 7 pgs.

"U.S. Appl. No. 09/457,466 Non Final Office Action mailed Oct. 25, 2002", 11 pgs.

"U.S. Appl. No. 09/457,466 Non Final Office Action mailed Oct. 27, 2003", 7 pgs.

"U.S. Appl. No. 09/457,466 Non Final Office Action mailed Nov. 20, 2000", 13 pgs.

"U.S. Appl. No. 09/457,466 Non Final Office Action mailed Dec. 23, 2004", 7 pgs.

"U.S. Appl. No. 09/457,466 Notice of Allowance mailed May 31, 2006", 8 pgs.

"U.S. Appl. No. 09/457,466 Notice of Allowance mailed Aug. 10, 2006", 8 pgs.

"U.S. Appl. No. 09/457,466 Notice of Allowance mailed Nov. 22, 2005", 8 pgs.

"U.S. Appl. No. 09/457,466 Response filed Jan. 4, 2002 to Final Office Action mailed Nov. 28, 2001", 15 pgs.

"U.S. Appl. No. 09/457,466 Response filed Jan. 22, 2004 to Non Final Office Action mailed Oct. 27, 2003", 14 pgs.

"U.S. Appl. No. 09/457,466 Response filed Jan. 23, 2003 to Non Final Office Action mailed Oct. 25, 2002", 8 pgs.

"U.S. Appl. No. 09/457,466 Response filed May 20, 2005 to Non Final Office Action mailed Dec. 23, 2004", 15 pgs.

"U.S. Appl. No. 09/457,466 Response filed Jun. 10, 2004 to Final Office Action mailed Apr. 13, 2004", 13 pgs.

"U.S. Appl. No. 09/457,466 Response filed Jul. 27, 2001 Non Final Office Action mailed Mar. 29, 2001", 7 pgs.

"U.S. Appl. No. 09/457,466 Response filed Aug. 19, 2002 to Non Final Office Action mailed Jun. 4, 2002", 11 pgs.

"U.S. Appl. No. 09/457,466 Response filed Dec. 21, 2000 to Non Final Office Action mailed Nov. 20, 2000", 8 pgs.

U.S. Appl. No. 09/457,466, Appeal Brief filed Sep. 16, 2004, 11 pgs.

U.S. Appl. No. 11/264,526, Non-Final Office Action mailed Oct. 9, 2008, 11 pgs.

U.S. Appl. No. 11/264,526, Preliminary Amendment filed Nov. 1, 2005, 11 pgs.

U.S. Appl. No. 11/264,526, Response filed Jan. 9, 2009 to Non-Final Office Action mailed Oct. 9, 2008, 11 pgs.

PCT Notification of Transmittal of the International Search Report or the Declaration, mailed Nov. 16, 2000.

PCT Notification of Transmittal of the International Search Report or the Declaration, mailed Aug. 27, 2001.

Priest, Chris and van Tol, Maarten, "Adaptive Agents in a Persistent Should Double Action", *ACM Digital Library*, Proceedings of the First International Conference on Information and Computation Economies, Oct. 25-28, 1998, pp. 11-18.

Resnick, Paul; Zeckhauser, Richard; Friedman, Eric; Kuwabara, Ko, "Reputation Systems", Association for Computing Machinery, *Communications of the ACM*, V. 43, N. 12, pp. 45-48, Dec. 2000.

Meade, Jim; "Visual 360: A Performance Appraisal System That's Fun", *HR Magazine*, 44, 7, 118(3), Jul. 1999.

"MEDIAPRAISE: Mediappraise Receives National Award for Web-based Technology That Enables Companies to Solve Thorny HR Problem", Raleigh, NC (Business Wire), Dec. 14, 1998.

U.S. Appl. No. 11/264,526, Notice of Allowance mailed Mar. 23, 2010, 6 pgs.

U.S. Appl. No. 11/264,526, Response filed Dec. 8, 2009 to Non Final Office Action mailed Sep. 8, 2009, 14 pgs.

\* cited by examiner

Category Listings — 210

Auction Items — 212

| | Picture | Lot Information | | Estimate | Starts at | Date/Time |
|---|---|---|---|---|---|---|
| | | Home > Browse by Category > Asian Arts > Japanese Arts | | | | |
| 214-1 | IMAGE | 45 characters log title test 1234789012345678 — 216-1<br>Catalog: 123 Collection - Sign up<br>Seller: Alibris | | $300-700 | $100 | 05/20<br>12:00 |
| 214-2 | IMAGE | 45 characters log title test 1234789012345678 — 216-2<br>(Live!)<br>Catalog: Tea and Coffee Vintage Collection - Sign up<br>Seller: Butterfield | Bid Now<br>View Live | $300-700 | $100 | 05/20<br>12:00 |
| 214-3 | IMAGE | 45 characters log title test 1234789012345678 — 216-3<br>Catalog: Lu Lu Estate Sale - Sign up<br>Seller: Lankes | | $300-700 | $100 | 05/20<br>12:00 |
| 214-4 | IMAGE | 45 characters log title test 1234789012345678 — 216-4<br>Catalog: Tea and Coffee Vintage Collection - Sign up<br>Seller: Butterfield | | $300-700 | $100 | 05/20<br>12:00 |
| 214-5 | IMAGE | 45 characters log title test 1234789012345678 — 216-5<br>Catalog: Lu Lu Estate Sale - Sign up<br>Seller: Lankes | | $300-700 | $100 | 05/20<br>12:00 |
| 214-6 | IMAGE | 45 characters log title test 1234789012345678 — 216-6<br>Catalog: Tea and Coffee Vintage Collection - Sign up<br>Seller: Butterfield | | $300-700 | $100 | 05/20<br>12:00 |

For more lots in this category, click these pages: = 1 = 2 3 4 5 6 7 8 9 (next page)

Home | Browse | Search | Registration | Services | Help
Great Collections | eBay | My eBay | Sign in

METHOD AND APPARATUS FOR HOLDING AN ONLINE LIVE AUCTION TO COMBINE FEATURES OF BOTH THE INTERNET AND TRADITIONAL, REAL WORLD AUCTIONS

This application is a Continuation-in-Part Application of a prior U.S. application Ser. No. 09/457,466, now U.S. Pat. No. 7,162,446 filed Dec. 8, 1999.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

FIELD OF THE INVENTION

The invention relates generally to the fields of auctioning and online commerce. More particularly, the invention relates to an online live auction format that combines features of both Internet and traditional, real world auctions.

BACKGROUND OF THE INVENTION

With the advent of online auctioning pioneered by eBay Inc., the assignee of the present invention, more and more Internet users are realizing the ease and convenience of buying items online. As the leading person-to-person trading site, buyers are compelled to trade on eBay's web site due to the large amount of content available. Similarly, sellers are attracted to eBay to conduct business where there are the most buyers. Ebay currently provides over two million new auctions, and 250,000 new items every day from which users may choose.

Auction houses that run live, real-time, on-site auctions ("traditional auctions") continue to experience much success. However, geographic barriers, travel costs, and other constraints limit the participation in such auctions.

It is desirable, therefore, to expand the reach of traditional auctions via the Internet. In particular, it would be advantageous to combine the best of both Internet and traditional auctions into a live auction that enables real-time online bids in a live, in-person auction.

BRIEF SUMMARY OF THE INVENTION

A method and apparatus are described for conducting a live auction that combines various features of traditional and online auctions. According to one aspect of the present invention, the live auction includes a live, in-person auction component and a real-time online bidding environment component. During the live, in-person auction, bidding information associated with an item in the online bidding environment is updated to reflect a current bid associated with the item in the live, in-person auction. A bid is accepted from an online bidder in the online environment that reflects the online bidder's bid price for the item. Subsequently, the system bids on behalf of the online bidder against one or more live bidders that are participating in the live, in-person auction.

Other features of the present invention will be apparent from the accompanying drawings and from the detailed description that follows.

BRIEF DESCRIPTION OF THE DRAWINGS

The present invention is illustrated by way of example, and not by way of limitation, in the figures of the accompanying drawings and in which:

FIGS. 2A-2C depict exemplary online live auction site screens that allows online bidders to participate in a live auction according to one embodiment of the present invention.

FIG. 2D depicts a seller console according to an exemplary embodiment of the invention.

DETAILED DESCRIPTION

Figure 1:
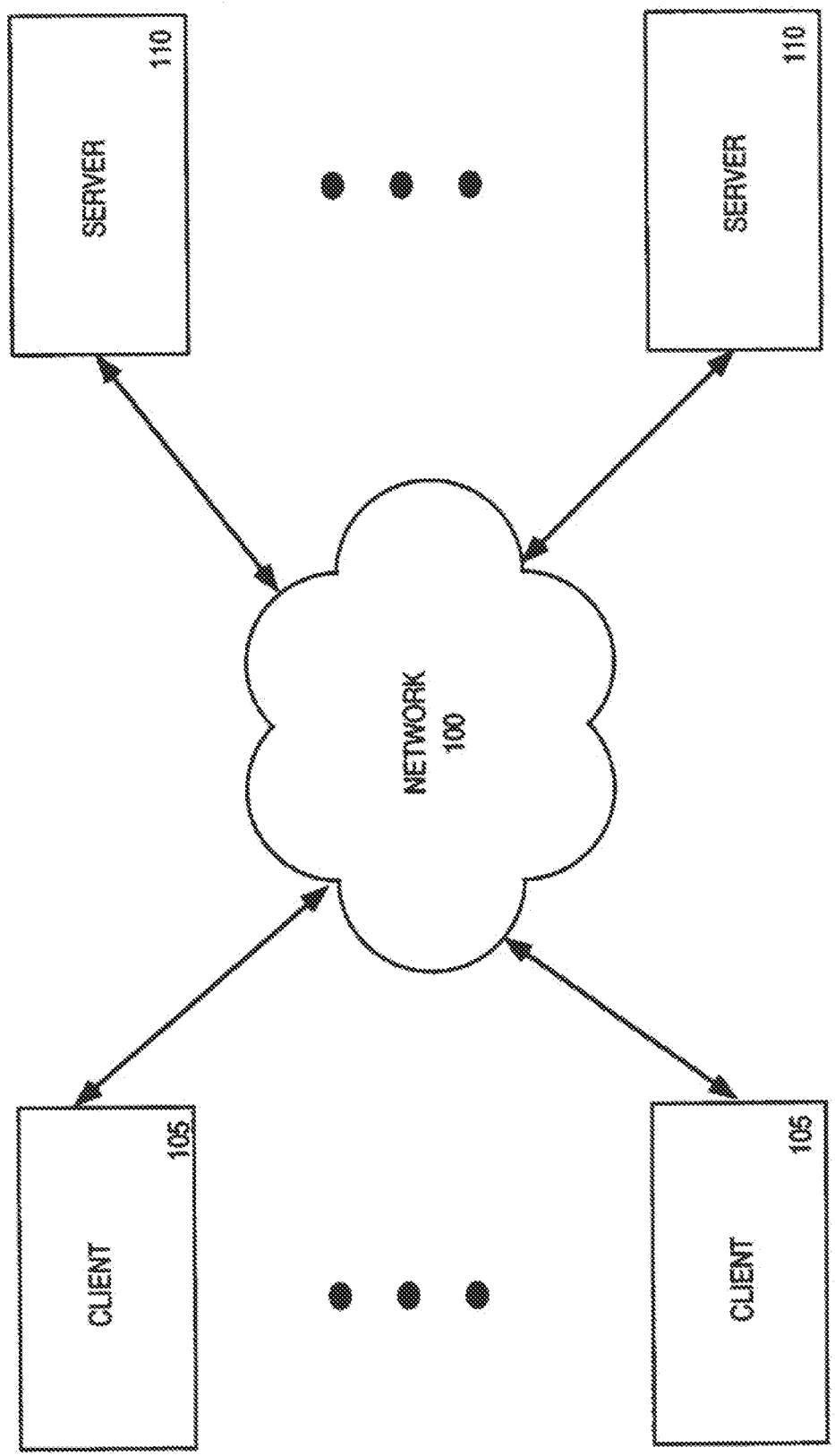
FIG. 1 is a simplified view of an exemplary client-server environment in which the live auction may occur according to one embodiment of the present invention.

A method and apparatus are described for carrying out a live auction that combines various features of traditional and online auctions, thereby enabling real-time online bids in a live, in-person auction. In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

As will be described in greater detail below, the present invention includes features that seek to enhance the traditional auctioning experience. According to one embodiment, a live auction combines various features of traditional and Internet auctions (also referred to as online auctions). In a first stage of the live auction, prior to a live, in-person auction, online users are provided access to catalog information for searching and viewing of items available in the live, in-person auction. In addition, during this first stage, any absentee bids are accepted from the online users for items available in the live, in-person auction. Subsequently, in a second stage of the live auction, the live, in-person auction begins. During this stage, bidding information is updated on the online auction site as bids from online bidders as well as live bidders are submitted to the live, in-person auction. During a final end of auction stage, the item is awarded to the highest bidder. An auction house, such as for example Butterfields, conducts the live, in-person auction. Advantageously, in this manner, the reach of traditional auctions may be expanded via the Internet, thereby enabling real-time online bidding in a live, in-person auction.

In the preferred embodiment, the steps of the present invention are embodied in machine-executable instructions. The instructions can be used to cause a general-purpose or special-purpose processor that is programmed with the instructions to perform the steps of the present invention. Alternatively, the steps of the present invention might be performed by specific hardware components that contain hardwired logic for performing the steps, or by any combination of programmed computer components and custom hardware components.

The present invention may be provided as a computer program product which may include a machine-readable medium having stored thereon instructions which may be used to program a computer (or other electronic devices) to perform a process according to the present invention. The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of media/machine-readable medium suitable for storing electronic instructions. Moreover, the present invention may also be downloaded as a computer program product, wherein the program may be transferred from a remote computer (e.g., a server) to a requesting computer (e.g., a client) by way of data signals embodied in a carrier wave or other propagation medium via a communication link (e.g., a modem or network connection).

Client-Server Environment

FIG. 1 is a simplified view of an exemplary client-server environment, such as the World Wide Web (the Web), in which the online portion of a live auction may take place. The architecture of the Web follows a conventional client-server model. The terms "client" and "server" are used to refer to a computer's general role as a requester of data (the client) or provider of data (the server). Web clients 105 and Web servers 110 communicate using a protocol such as HyperText Transfer Protocol (HTTP). In the Web environment, Web browsers reside on clients and render Web documents (pages) served by the Web servers. The client-server model is used to communicate information between clients 105 and servers 110. Web servers 110 are coupled to the Internet 100 and respond to document requests and/or other queries from Web clients 105. When a user selects a document by submitting its Uniform Resource Locator (URL), a Web browser, such as Netscape Navigator or Internet Explorer, opens a connection to a server 110 and initiates a request (e.g., an HTTP get) for the document. The server 110 delivers the requested document, typically in the form of a text document coded in a standard markup language such as HyperText Markup Language (HTML).

Exemplary Online Auctioning Site Interface

Figure 2A:

FIG. 2A is an exemplary online live auction site screen that allows online bidders to participate in a live, in-person auction. According to one embodiment, when an online bidder wishes to participate in, or inquiry into Live Auctions, the online user is presented with the Live Auctions Home Page screen (Live Auction Screen) 200. The Live Auction Screen 200 provides a listing of all catalogs available in various live, in-person auctions in which the online user may bid. From the Live Auction screen 200, the online user is forwarded to various screens that will allow the user to search and view items, listen or view live, in-person auctions and submit real-time bids in the live, in-person auctions.

FIG. 2B is an exemplary online live auction site screen that allows online bidders to participate in a live, in-person auction. According to one embodiment, when an online bidder makes a request to search and view a catalog for items available in the live, in-person auction, category listings screen 210 is presented with a textual list of items 212. In this example, each item 214 (214-1, 214-2, . . . , 214-6) includes a hypertext link 216 (216-1, 216-2, . . . , 216-6) having a picture of the item, a title, a brief description, a high/low estimate and a starting price. Responsive to the selection of the hypertext link 215, a subsequent screen (not shown) displays the item and allows the online user to enter an absentee bid for the item 210, when the user will be unavailable during the live, in-person auction. As will be described further below, by providing an absentee bid amount, an absentee bidding system may bid on behalf of the absentee bidder as necessary by increasing the online bidder's bid by the current bid increment until the absentee bid is reached. Advantageously, in this manner, the absentee bidder need not keep track of the auction as it proceeds and is assured he/she will not be outbid at the last minute—unless the absentee bid is exceeded. However, once the absentee bid is exceeded, the absentee bidder has no chance to win the item.

Figure 2C:

FIG. 2C is an exemplary online live auction site screen that allows online bidders to submit bids in a live, in-person auction. According to one embodiment, when an online bidder makes a request to participate in the live, in-person auction, the user is directed to a real-time event screen 220. The real time event screen 220 is automatically updated to reflect the current lot on sale and also includes the name of the seller and the catalog. As described herein, a lot refers to one item or a group of items that will be auctioned together as part of a sale. Screen 220 also includes the following: a lot number, a lot picture, current price, current high bidder, bid button for automatic bids, bid box for bids above the current price, amount of absentee bid previously placed by any user, on/off button for live webcasts, a promotional message, link to the corrigenda (announcements), titles of next three supporting lots, and the current time. The real-time event screen 220 enables online bidders to either view or listen to the live, in-person auction. Depending on the option the online bidder selects an audio or audio/video stream is sent to the online bidder's computer. The stream is originated at the auction house and generally captures the auctioneer's actions. The audio stream is provided in, for example, Windows or Real Player formats. Implementation details regarding video and audio streaming over the Internet are known to those skilled in the art and are therefore not further provided herein.

Figure 2D:
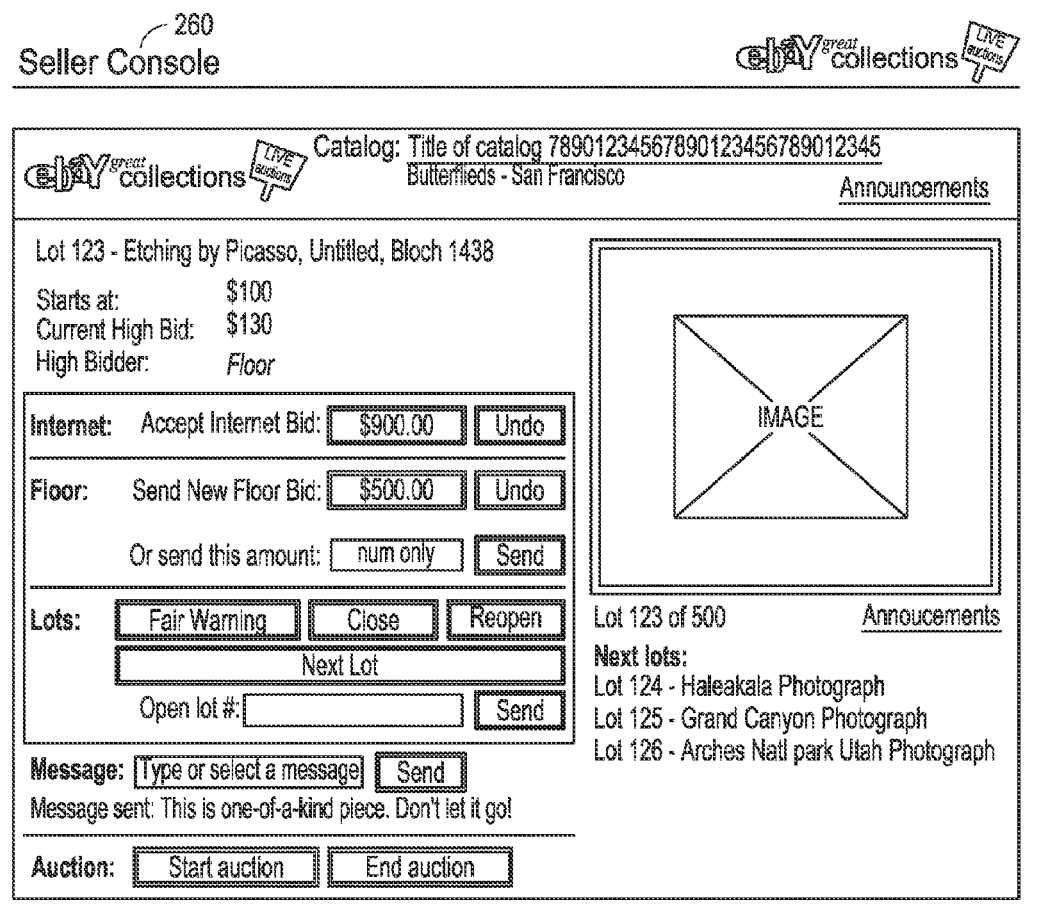

FIG. 2D depicts an exemplary floor/internet live auction interface (seller console) 260. The live auction seller console 260 allows sellers to accept and communicate Internet bids, update current bid, and call prices and allows opening and closing of lots. The seller console 260 allows bidders, whether on the floor or on the Internet, to participate in the live in-person auction simultaneously and on equal footing.

Figure 2E:
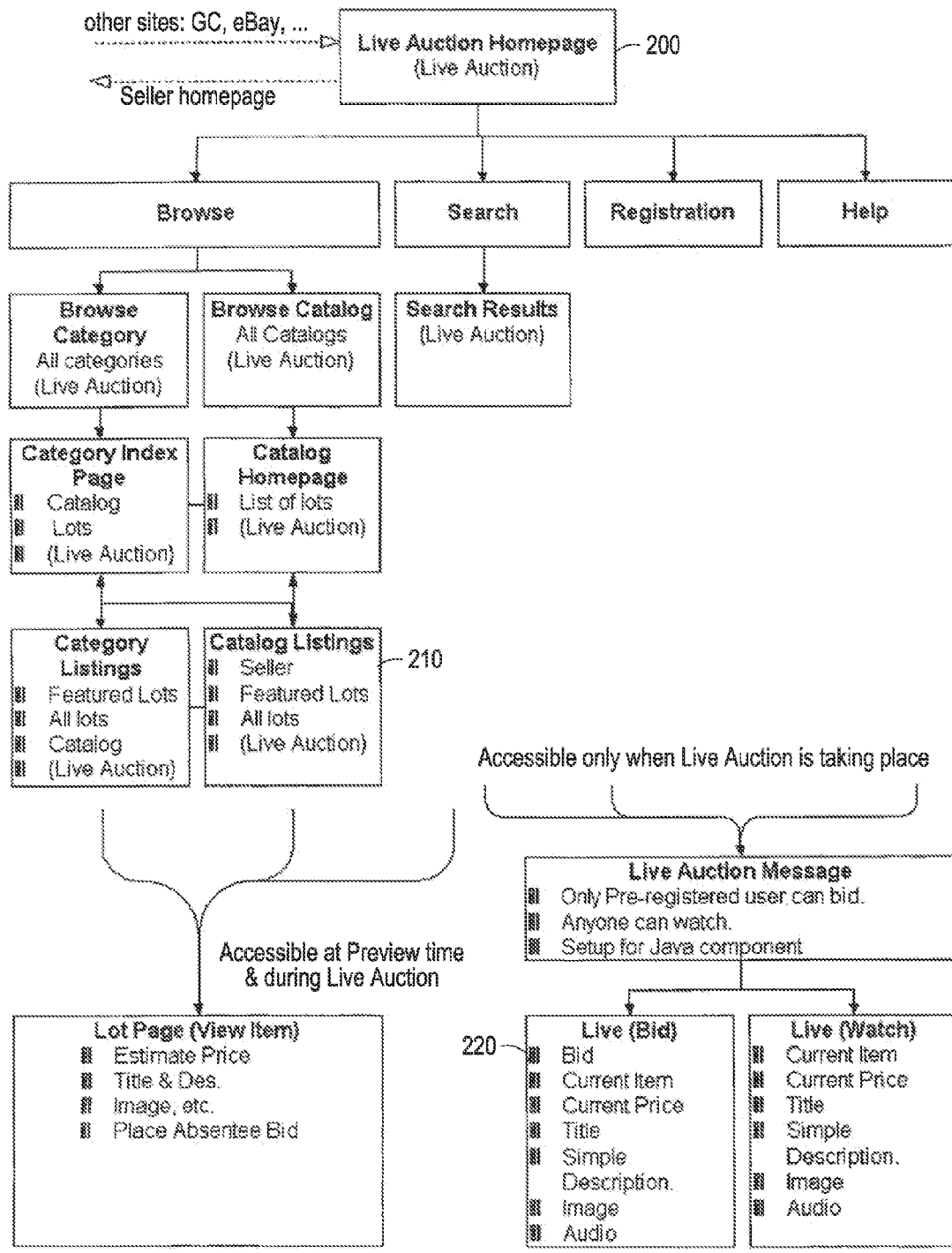
FIG. 2E depicts a Live Auction Site Information Architecture according to an exemplary embodiment of the invention.

FIG. 2E depicts the Live Auction Site Information Architecture 280. The information architecture is provided as an exemplary high level map for navigation of the Live Auction screen 200, as described above. From the Live Auction screen 200, the users may browse or search items, registers for Live Auction, or seek help. Browsing and search of items eventually leads the user to the category listing screen 210, as described above. Once a live, in-person auction begins, the user may submit real-time online bids via the real-time event screen, as described above.

Exemplary Computer System

Figure 3:
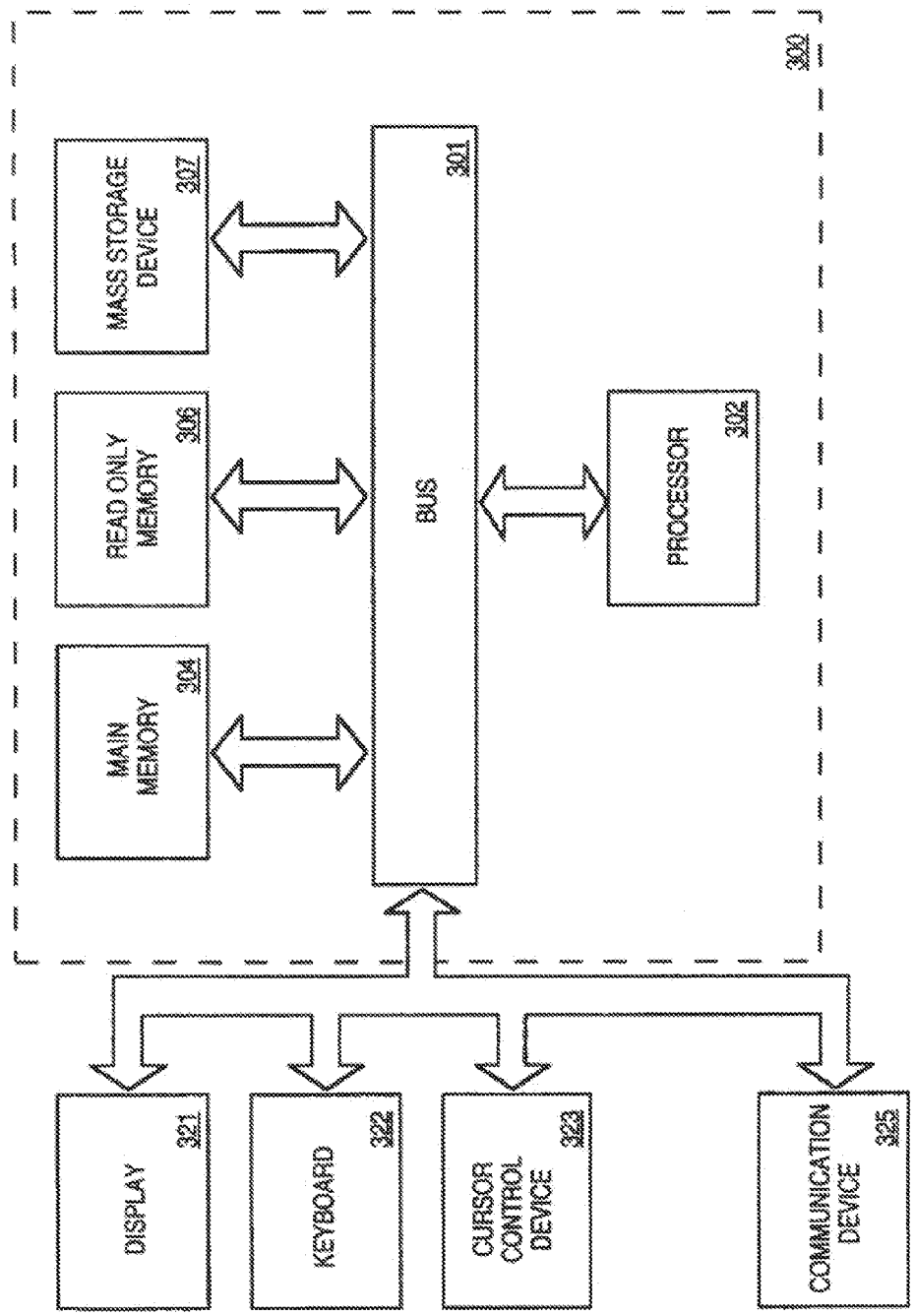
FIG. 3 is an example of a computer system upon which one embodiment of the present invention may be implemented.

A computer system 300 representing an exemplary server in which features of the present invention may be implemented will now be described with reference to FIG. 3.

Computer system 300 comprises a bus or other communication means 301 for communicating information, and a processing means such as processor 302 coupled with bus 301 for processing information. Computer system 300 further comprises a random access memory (RAM) or other dynamic storage device 304 (referred to as main memory), coupled to bus 301 for storing information and instructions to be executed by processor 302. Main memory 304 also may be used for storing temporary variables or other intermediate information during execution of instructions by processor 302. Computer system 300 also comprises a read only memory (ROM) and/or other static storage device 306 coupled to bus 301 for storing static information and instructions for processor 302.

A data storage device 307 such as a magnetic disk or optical disc and its corresponding drive may also be coupled to computer system 300 for storing information and instructions. Computer system 300 can also be coupled via bus 301 to a display device 321, such as a cathode ray tube (CRT) or Liquid Crystal Display (LCD), for displaying information to a computer user. Typically, an alphanumeric input device 322, including alphanumeric and other keys, may be coupled to bus 301 for communicating information and/or command selections to processor 302. Another type of user input device is cursor control 323, such as a mouse, a trackball, or cursor direction keys for communicating direction information and command selections to processor 302 and for controlling cursor movement on display 321.

A communication device 325 is also coupled to bus 301 for accessing remote servers via the Internet, for example. The communication device 325 may include a modem, a network interface card, or other commercially available network interface devices, such as those used for coupling to an Ethernet, token ring, or other type of network. In any event, in this manner, the computer system 300 may be coupled to a number of clients and/or other servers via a conventional network infrastructure, such as a company's Intranet and/or the Internet, for example.

System Overview

Figure 4:
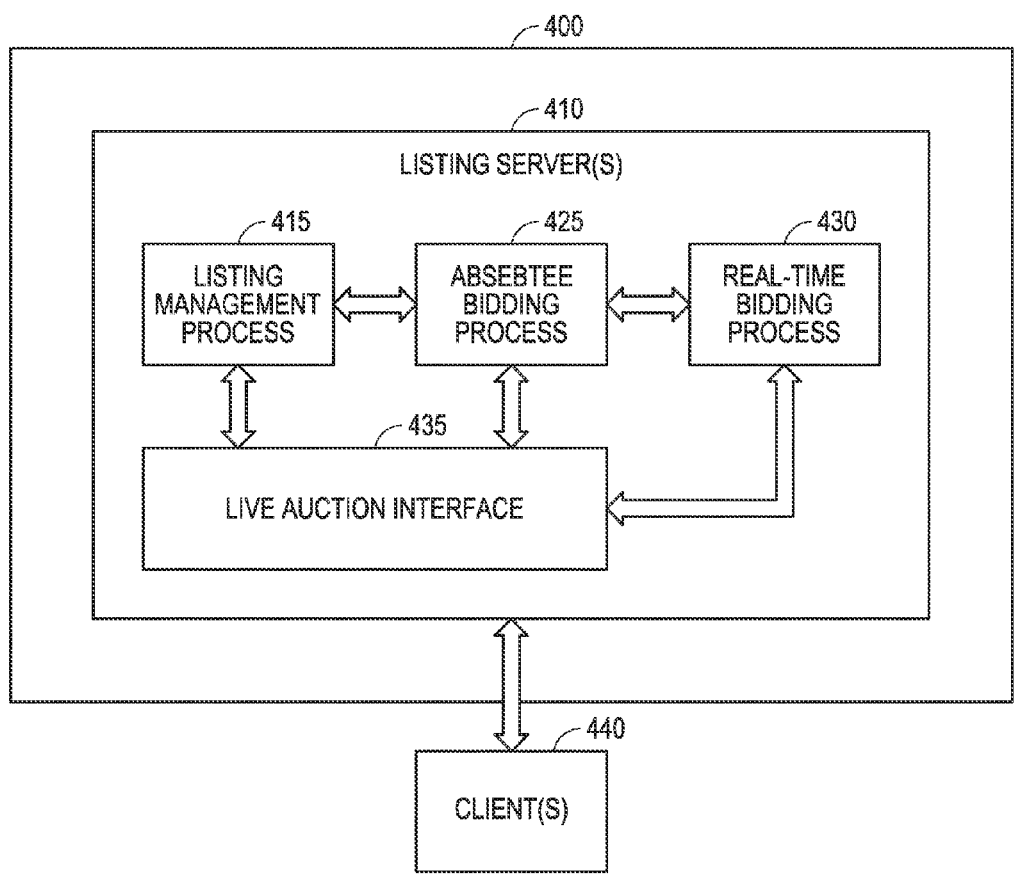
FIG. 4 is a high level illustration of the interaction between various devices and processes according to one embodiment of the present invention.

FIG. 4 is a high level illustration of the interaction between various devices and processes according to one embodiment of the present invention. According to the embodiment depicted, an online, live auction site system 400 may comprise one or more listing servers 410. In this example, the listing servers 410 include a listing management process 415, an absentee bidding process 425, a real-time bidding process 430 and a live auction interface 435. Clients 440 interact with the listing management process 415 and the absentee bidding process 425 to view information about items for sale in the live, in-person auction and submit absentee bids, respectively.

The listing management process 415 interacts with online bidders and provides them with catalog information about the items in which they are interested. The listing management process 415 may support a text-based item listing format, such as that depicted in FIGS. 2A and 2B, and/or a Gallery™ presentation format that includes thumbnail images of the items for sale as described in co-pending U.S. patent application Ser. No. 09/177,726, entitled "Information Presentation and Management in an Online Trading Environment" and assigned to the assignee of the present invention (GALLERY is a trademark of eBay Inc. of San Jose, Calif.).

The absentee bidding process 425 tracks bids submitted by online bidders for the items 210 available in the live, in-person auction. Based upon the bid amounts received, the absentee bidding process 425 selects an absentee bid as the second highest absentee bid received plus a one bid increment amount as listed in a bid increment table provided by the seller.

The live auction interface 435 provides an interface that updates bidding information associated with an item in the online environment to reflect a current bid associated with the item in the live, in-person auction. A real-time bidding process 430 accepts bids from the online bidders, via the live auction interface, reflecting the online bidder's bid price for the item, and bids on behalf of the online bidder against one or more live bidders that are participating in the live, in-person auction. The real-time bidding process 430 in conjunction with the live auction interface 435 enables real-time online bidding in the live, in-person auction While, in order to facilitate explanation, the listing servers 410 are generally discussed as if they were a single device, in actuality, the listing servers 410 may comprise multiple physical and/or logical devices connected in a distributed architecture, and the various functions performed may actually be distributed among multiple devices. For example, any function can be implemented on any number of machines or on a single machine. Also, any process may be divided across multiple machines.

Figure 5:
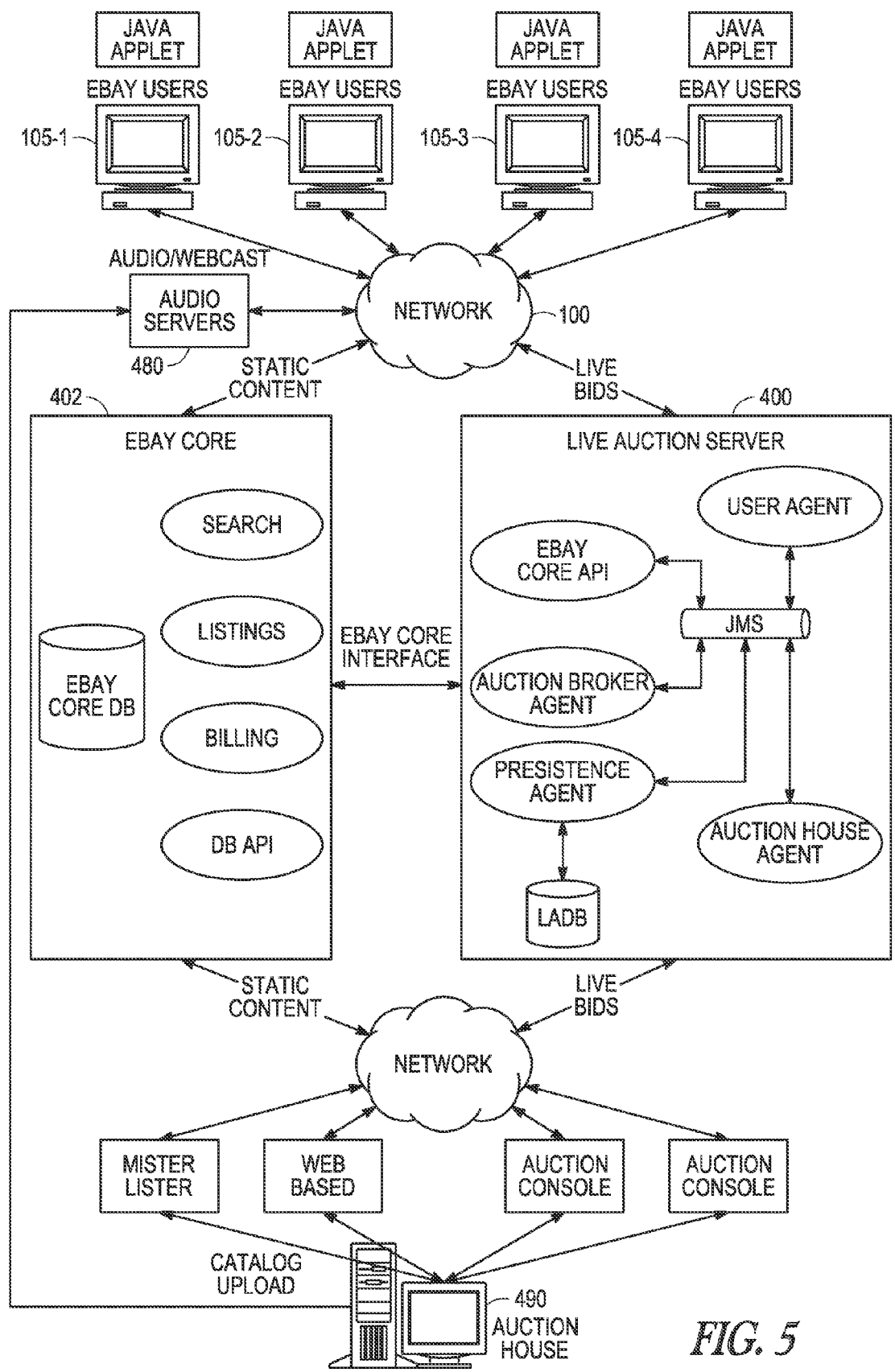
FIG. 5 depicts an exemplary high-level system architecture implementation of the present invention.

FIG. 5 depicts an exemplary high-level system architecture implementation 450 of the Live Auction System 400. The exemplary system architecture 450 incorporates various aspects of FIGS. 1, 3 and 4. Online user 105 (105-1, 105-1, . . . , 105-4) interaction with the live auction system 400 as well as auction house 490 interaction with the live auction system 400 is depicted. An audio server 480 for providing a webcast to online bidders during the live, in-person auction is also depicted. The system architecture 450 is illustrated to provide a high level view of the various components required to implement the live auction system 400. Specific implementation details are provided above with reference to FIGS. 1, 3 and 4, as well as the knowledge available to those skilled in the art to which this invention pertains.

Exemplary Stages of an Integrated Auction

Figure 6:
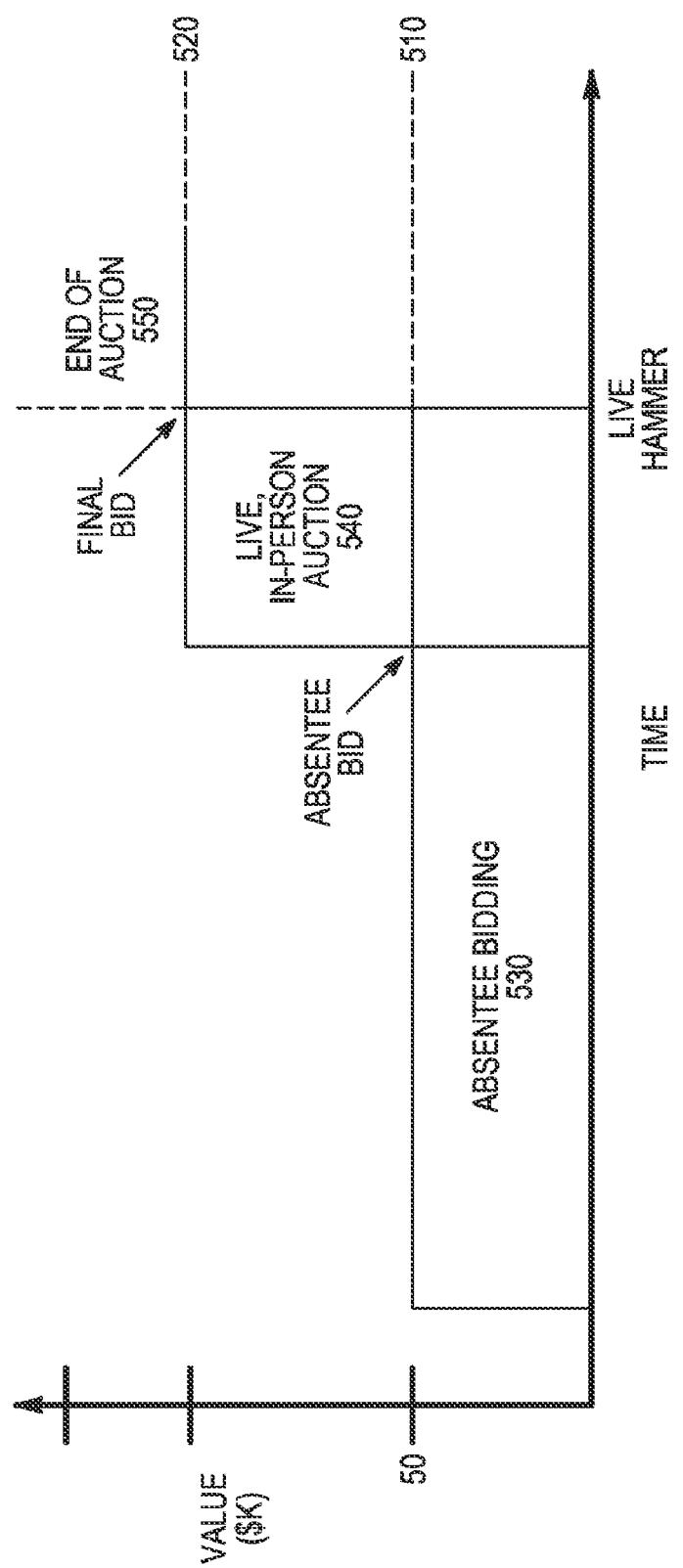
FIG. 6 conceptually illustrates the stages of a live auction according to one embodiment of the present invention.

FIG. 6 conceptually illustrates the stages of a live auction according to one embodiment of the present invention. In this example, a live auction comprises three separate and distinct stages: a pre-auction stage 530, a real-time bidding stage 540, and an end auction stage 550. During the pre-auction stage 530, online users are allowed to search and view items available during the live, in-person auction. In addition, online users that will be unavailable to submit real time bids during the live, in-person auction may submit absentee bids. An absentee bid 510 will be chosen from the absentee bids received during the pre-auction stage 530 and submitted during the live, in-person auction as described below.

Although absentee bids are not required by the present invention, FIG. 6 depicts a final absentee bid 510 chosen in the amount of $50,000. The choice of a final absentee bid 510 signals the beginning of the real-time bidding stage 540. During the real-time bidding stage 540, online bidders bid against other online bidders as well as one or more live bidders that are present at the live, in-person auction. Referring again to FIG. 5, a final bid amount 520 is accepted that exceeds the absentee bid 510 received during the pre-auction stage 530 and signals the beginning of the end-of-auction stage 550. During the end-of-auction stage 550, an online user that enters the final bid is notified via e-mail.

Live Auction Flow

Figure 7A:
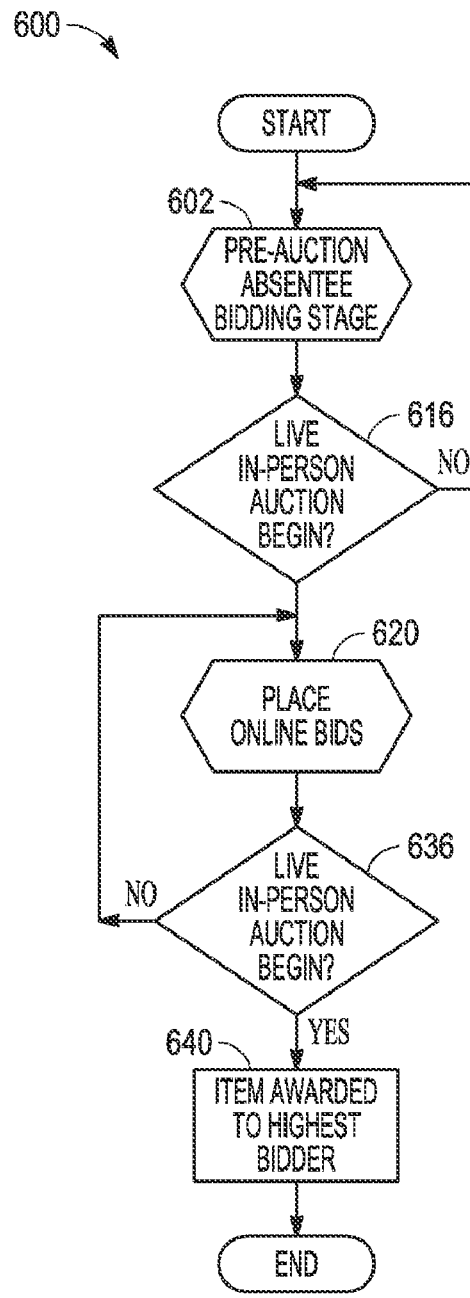
FIGS. 7A-7C are flow diagrams illustrating live auction processing according exemplary embodiments of the present invention.

Procedural method steps for implementing the live auction as described by the present invention are now provided. Referring now to the flow diagram of FIG. 7A, exemplary live auction processing 600 will now be described. At step 602, the live auction begins with the pre-auction absentee bidding stage 530 in which absentee bids are submitted by online users. The pre-auction bidding stage 602 continues until the start of the live, in-person auction at step 616. During the live, in-person auction, the live auction system 400 bids on behalf of any online bidders against one or more live bidders that are participating in the live, in-person auction at step 620, thereby enabling real-time online bidding in the live, in-person auction. Online bids are placed by the live auction system 400 until the live, in-person auction terminates at step 636. Finally, at step 640, the item for bid is awarded to the highest bidder.

Figure 7B:
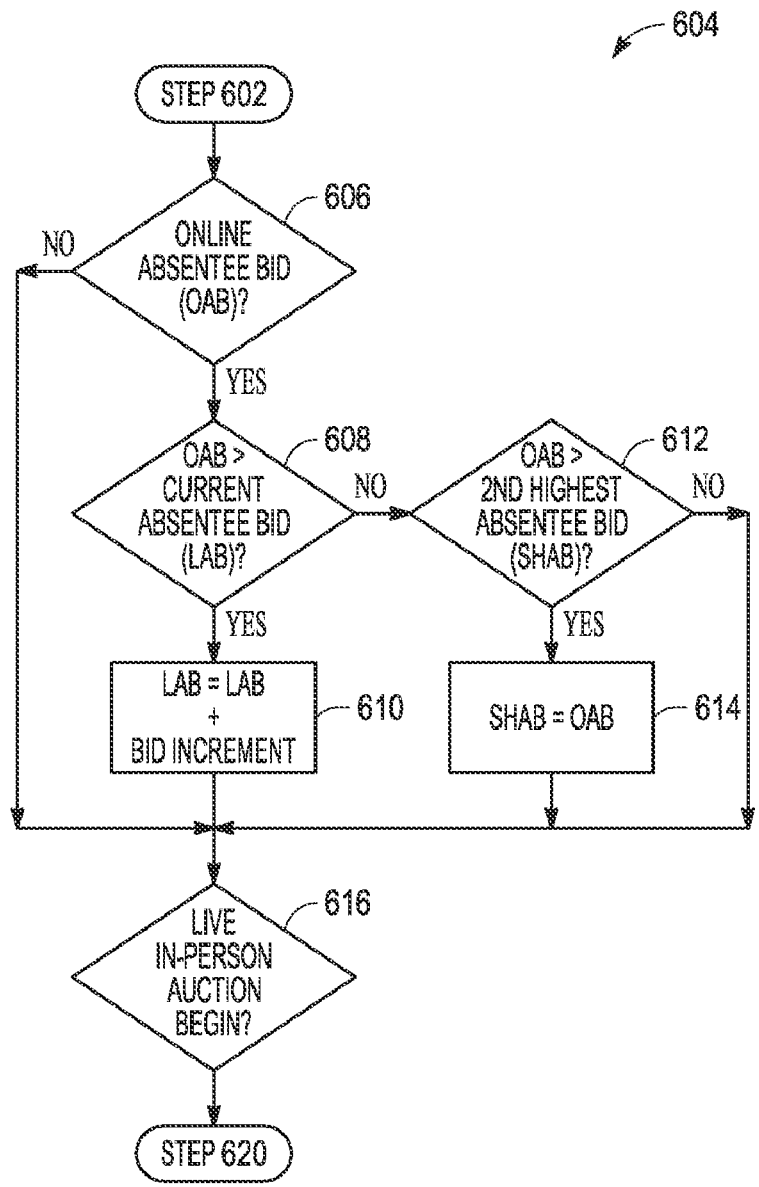
Figure 7C:
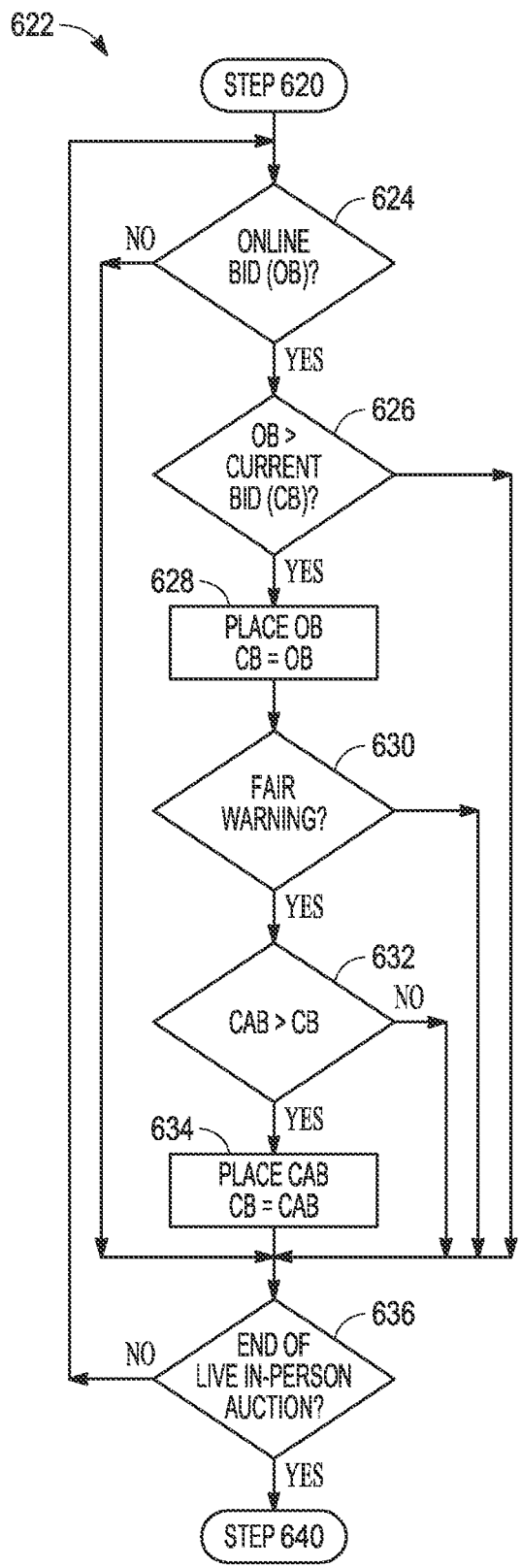

FIG. 7B depicts additional method steps 604 for implementing the pre-auction absentee bidding stage 530 of step 602. At step 606, the pre-auction online bidding stage 530, begins with the receipt of any online absentee bids. As described above, the receipt of absentee bids is optional and is not required for the implementation of the live auction. At step 608, an absentee bid is received and compared with any current absentee bids received by the live auction system. At 610, when the online absentee bid is greater than the current absentee bids received by the system 400, the current absentee bid is updated to equal the current absentee bid plus a bid increment provided by the seller in a bid increment table. Otherwise, at step 612, the online absentee bid received at step 606 is greater than a second highest absentee bid received by the system 400, step 614 is initiated. At step 614, the second highest absentee bid is set to the online absentee bid received at step 606. Otherwise the online absentee bid received at step 606 is discarded. As described above, the pre-auction absentee bidding stage 602 continues until the start of a live, in-person auction at step 616.

Once an online bid is received, the online bid is compared with the current bid of the live, in-person auction. If the online bid is greater than the current bid, the online bid is placed in the live, in-person auction. Otherwise the online bid is discarded. Then, the highest accepted current absentee bid is compared with the current bid in the live in-person auction. If the current absentee bid is greater than the current bid in the live in-person auction, the current absentee bid is converted to the current bid in the live, in-person auction. Otherwise the absentee bid is discarded. As described above, the real-time online bidding continues until the end of the live, in-person auction. As described with reference to FIG. 6A, the end of the live, in-person auction results in the occurrence of the end-of-auction in which the item is awarded to the highest bidder. Assuming the highest bidder is an online bidder, the live auction system notifies the online bidder via email.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A computer-implemented method, comprising:
   prior to a live, in-person auction,
      establishing an absentee bid for an item in an online environment by performing a pre-auction absentee bidding process in the online environment, the pre-auction absentee bidding process including,
      communicating, via a communication device, the item to pre-auction online users,
      receiving absentee bids for the item from pre-auction online bidders, and
      determining, using a processor, that an online absentee bid is a highest absentee bid from the absentee bids received by comparing the online absentee bid with the current highest absentee bid, the highest absentee bid being placed by a pre-auction online bidder; and
      in response to the determination that the online absentee bid is the highest absentee bid, communicating the highest absentee bid for the item to the live, in-person auction; and
   during the live, in-person auction,
      updating bidding information associated with the item in the online environment to reflect a current bid associated with the item in the live, in-person auction, wherein the current bid includes a highest live bid received from a live online bidder,
      accepting bids from live online bidders in the online environment, the bids reflecting the live online bidders' bid price for the item, beginning of the accepting of the bids being signaled by receiving of the highest absentee bid, and
      bidding on behalf of the pre-auction online bidder of the highest absentee bid against the live online bidders to enable real-time online bidding in the live, in-person auction between the pre-auction online bidder and the live online bidders that are participating in the live, in-person auction.

2. The computer-implemented method of claim 1, wherein the bidding on behalf of the pre-auction online bidder comprises bidding the highest absentee bid for the item when an amount of the highest absentee bid exceeds the current bid for the item.

3. The computer-implemented method of claim 1, wherein the communicating of the highest absentee bid includes, when 'fair warning' is selected at a value below the highest absentee bid that has not been previously accepted, converting the highest absentee bid into the current bid.

4. The computer-implemented method of claim 1, wherein the communicating of the highest absentee bid for the item to the live, in-person auction comprises providing access to catalog information for items available in the live, in-person auction to the pre-auction online users to search the catalog information and view the items in preparation for pre-auction absentee biding.

5. The computer-implemented method of claim 1, further comprising during the live, in-person auction, providing live online users with an audio webcast of the live, in-person auction.

6. The computer-implemented method of claim 1, further comprising during the live, in-person auction, providing the live online users with a video webcast of the live, in-person auction.

7. A computer-implemented method, comprising:
   prior to a live, in-person auction, establishing an absentee bid for an item in an online environment by performing a pre-auction absentee bidding process in the online environment, the pre-auction absentee bidding process including,
      communicating, via a communication device, the item to pre-auction online users,
      receiving absentee bids for the item from pre-auction online bidders, and
      determining, using a processor, that an online absentee bid is a highest absentee bid from the absentee bids received by comparing the online absentee bid with the current highest absentee bid, the highest absentee bid is placed by a pre-auction online bidder; and
      in response to the determination that the online absentee bid is the highest absentee bid, communicating the highest absentee bid for the item to the live, in-person auction; and
   performing the live, in-person auction including bidding on behalf of the pre-auction online bidder of the highest absentee bid against live online bidders to enable real-time online bidding in the live, in-person auction between the pre-auction online bidder and the online bidders that are participating in the live, in-person auction, beginning of accepting of bids from online bidders being signaled by receiving of the highest absentee bid.

8. The computer-implemented method of claim 7, wherein the communicating of the highest absentee bid includes, when 'fair warning' is selected at a value below the highest absentee bid that has not been previously accepted, converting the highest absentee bid into the current bid.

9. The computer-implemented method of claim 7, wherein the communicating of the highest absentee bid for the item to the live, in-person auction, comprises providing access to catalog information for items available in the live, in-person auction to the pre-auction online users to search the catalog information and view the items in preparation for pre-auction absentee biding.

10. The computer-implemented method of claim 7, further comprising:
during the live, in-person auction, updating bidding information associated with the item in the online environment to reflect the current bid associated with the item in the live, in-person auction; and
accepting bids from the live online bidders in the online environment, the bids reflecting the live online bidders' bid price for the item.

11. A computer system to perform a live, in-person auction and a pre-auction absentee bidding process, the system comprising:
a listing server computer coupled with one or more client computers to provide pre-auction online users and live online users access to one or more of the following:
the pre-auction absentee bidding process and the live, in-person auction, the listing server having
a storage medium; and
a processor coupled to the storage medium, the processor to prior to the live, in-person auction, establish an absentee bid for an item in an online environment by performing the pre-auction absentee bidding process in the online environment, the pre-auction absentee bidding process including
communicating the item to the pre-auction online users,
receiving absentee bids for the item from pre-auction online bidders, and
determining that an online absentee bid is a highest absentee bid from the absentee bids by comparing the online absentee bid with the current highest absentee bid, the highest absentee bid is placed by a pre-auction online bidder;
in response to the determination that the online absentee bid is the highest absentee bid, communicate the highest absentee bid for the item to the live, in-person auction, and
perform the live, in-person auction includes bidding on behalf of the pre-auction online bidder of the highest absentee bid against live online bidders to enable real-time online bidding in the live, in-person auction between the pre-auction online bidder and the online bidders that are participating the live, in-person auction, beginning of accepting of bids from online bidders being signaled by receiving of the highest absentee bid.

12. The system of claim 11, wherein the processor is further to:
during the live, in-person auction, update bidding information associated with the item in the online environment to reflect the current bid associated with the item in the live, in-person auction; and
accept bids from the live online bidders in the online environment, the bids reflecting the live online bidders' bid price for the item.

13. The system of claim 11, wherein the processor is further to prior to the live, in-person auction, provide access to catalog information for items available in the live, in-person auction to the pre-auction online users to search the catalog information and view the items in preparation for pre-auction absentee biding.

14. The system of claim 11, wherein the processor is further to during the live, in-person auction, provide the live online users with one or more of the following: an audio webcast of the live, in-person auction and a video webcast of the live, in-person auction.

15. The computer-implemented method of claim 10, further comprising, during the live, in-person auction, providing the live online users with an audio webcast of the live, in-person auction.

16. The computer-implemented method of claim 10, further comprising during the live, in-person auction, providing the live online users with a video webcast of the live, in-person auction.

17. The computer-implemented method of claim 10, wherein the bidding on behalf of the pre-auction online bidder comprises bidding the highest absentee bid for the item when an amount of the highest absentee bid exceeds the current bid for the item.

\* \* \* \* \*

UNITED STATES PATENT AND TRADEMARK OFFICE
CERTIFICATE OF CORRECTION

| | |
|---|---|
| PATENT NO. | : 7,840,472 B1 |
| APPLICATION NO. | : 09/620809 |
| DATED | : November 23, 2010 |
| INVENTOR(S) | : Daniele Levy et al. |

It is certified that error appears in the above-identified patent and that said Letters Patent is hereby corrected as shown below:

On page 3, under "Other Publications", in column 1, line 4, delete "Liepens" and insert -- Liepins --, therefor.

On page 3, under "Other Publications", in column 1, line 38, delete ""Electrnic" and insert -- "Electronic --, therefor.

On page 3, under "Other Publications", in column 1, lines 44-45, delete "Technocal" and insert -- Technical --, therefor.

On page 3, under "Other Publications", in column 1, line 50, delete "Reaearch—Electrnic" and insert -- Research—Electronic --, therefor.

On page 3, under "Other Publications", in column 1, line 53, delete "Liquifity"," and insert -- Liquidity", --, therefor.

On page 3, under "Other Publications", in column 1, line 56, delete "Mechinism" and insert -- Mechanism --, therefor.

On page 3, under "Other Publications", in column 1, line 65, delete "Technocal" and insert -- Technical --, therefor.

On page 3, under "Other Publications", in column 1, line 70, delete "Clemins," and insert -- Clemons, --, therefor.

On page 3, under "Other Publications", in column 2, line 13, delete "Electrnic" and insert -- Electronic --, therefor.

On page 3, under "Other Publications", in column 2, line 20, delete ""Trasing-Process" and insert -- "Trading-Process --, therefor.

Signed and Sealed this
Twenty-fifth Day of January, 2011

David J. Kappos
*Director of the United States Patent and Trademark Office*

CERTIFICATE OF CORRECTION (continued)
U.S. Pat. No. 7,840,472 B1

On page 3, under "Other Publications", in column 2, line 31, delete "Electrnic" and insert -- Electronic --, therefor.

On page 4, under "Other Publications", in column 2, line 14, delete "Mediappraise" and insert -- Mediapraise --, therefor.

In the drawings:

On Sheet 8 of 13, in Reference Numeral 425, in Figure 4, line 1, delete "ABSEBTEE" and insert -- ABSENTEE --, therefor.

On Sheet 9 of 13, in Reference Numeral 400, in Figure 5, line 8, delete "PRESISTENCE" and insert -- PERSISTENCE --, therefor.

In column 6, line 7, after "auction" insert -- . --.

In column 7, line 19, delete "the" and insert -- if the --, therefor.

In column 9, line 14, in Claim 9, delete "auction," and insert -- auction --, therefor.

In column 10, line 26, in Claim 13, delete "to prior" and insert -- to, prior --, therefor.

In column 10, line 32, in Claim 14, delete "to during" and insert -- to, during --, therefor.